US 6,609,944 B1

(12) United States Patent
Viola

(10) Patent No.: US 6,609,944 B1
(45) Date of Patent: Aug. 26, 2003

(54) ANIMAL BALL TOY

(76) Inventor: Charles A. Viola, 511 S. 2nd St., Fairfield, IA (US) 52556

( * ) Notice: Subject to any disclaimer, the term of this patent is extended or adjusted under 35 U.S.C. 154(b) by 0 days.

(21) Appl. No.: 10/155,750

(22) Filed: May 24, 2002

(51) Int. Cl.[7] .............................................. A63H 11/00
(52) U.S. Cl. ...................... 446/409; 119/707; 473/595
(58) Field of Search .............................. 119/707, 702, 119/708, 709, 710, 711; 446/184, 267, 397, 409, 180, 183, 213; 473/609, 595, 571

(56) References Cited

U.S. PATENT DOCUMENTS

| 1,352,047 | A | 9/1920 | Boje | |
|---|---|---|---|---|
| D142,395 | S | 9/1945 | Fisk et al. | D34/15 |
| D145,875 | S | 11/1946 | Plebanek | D34/15 |
| 2,960,794 | A | 11/1960 | Johns | 46/135 |
| 4,321,888 | A | 3/1982 | Topliffe | 119/709 |
| 5,205,773 | A | 4/1993 | Koepcke et al. | 446/183 |
| 5,577,723 | A | 11/1996 | Resta et al. | 273/58 H |
| 5,769,682 | A | 6/1998 | DiResta et al. | 446/184 |
| 5,846,116 | A | 12/1998 | DiResta et al. | 446/184 |
| D424,256 | S | 5/2000 | Lindgren | D30/160 |
| 6,109,998 | A | 8/2000 | DiResta et al. | 446/184 |

Primary Examiner—Jacob K Ackun

(57) ABSTRACT

A ball toy 10 intended for use by pets that is molded of a flexible, resilient material, containing a hollow cavity inside 22. Attached to the hollow cavity is a squeaker 20. The squeaker 20 is activated by air rushing through it, into and out of the hollow cavity within the ball, as the ball 10 is squeezed and released. The ball. 10 is essentially round, allowing it to roll freely and easily in any direction. The ball 10 has features molded in relief on its outer surface 12 which resemble the face 14, legs 16, and tail 18 of an animal. The protruding features 14, 16, 18 cause the ball 10 to roll in a slightly erratic manner and may cause a light pitter-patter sound when the ball 10 rolled on a smooth surface, thus creating a resemblance to a small scurrying animal.

1 Claim, 4 Drawing Sheets

ANIMAL BALL TOY

FIELD OF INVENTION

The disclosed invention is a novel toy intended for use by cats, dogs, ferrets, and other pets that chase small animals and play with balls. The present invention relates to balls made of flexible, resilient material and to toys that incorporate squeakers that may activated by squeezing the toy.

DESCRIPTION OF PRIOR ART

Pets such as cats, dogs, and ferrets are hunters by nature and are said to instinctively chase after small animals. Therefore they have a tendency to engage in play activities that involve chasing and catching small objects such as rolling balls. Many types of balls or ball-like toys have been invented to appeal to the play patterns of pets. Some of these balls incorporate features that make them resemble animals in order to more strongly appeal to the hunting instinct that is believed to be at the basis of the play activity.

In addition, ball toys for pets commonly incorporate a squeaker that produces a high-pitch sound not unlike the sound a small creature might make. The squeaker is thought to add another level of interest to the pet by making the toy more like a living animal.

U.S. Pat. No. 1,352,047 to Boje and U.S. Pat. No. 2,960,794 to Johns both show a hollow toy ball with facial features that bring to mind an animal. Both inventions have features that pop out or protrude when the ball or toy is pressed or squeezed. Such a devices must be airtight so that no air can escape, since the pop-out features rely on internal air pressure to cause them to protrude. Therefore, no air-activated squeaker can be utilized in these devices, since such a squeaker depends upon air rushing through it, escaping from the hollow inside of the device and thereby relieving the internal air pressure.

In addition, neither of the above-mentioned patents teach a toy that depicts the entire animal complete with body and limbs. Therefore they do not convey a convincing image of a real living animal.

U.S. Pat. No. 5,205,773 to Koepeke et al disloses a device which, like those of Boje and Johns, depends upon internal air pressure to cause part of it to protrude when the device is squeezed or deformed. Therefore the device of Koepeke also cannot utilize an air-activated squeaker.

U.S. Pat. No. 5,577,723 to Resta et al shows a squeezable toy ball that simulates the appearance of a human organ. The device is filled with fluid that produces a gurgling sound. Such a device is not suitable for use by pets such as cats, dogs, or ferrets because the sharp teeth of the pet would likely pierce the outer shell of the device during rough play, causing the fluid to leak out, possibly damaging the home in which it may be used or harming the pet who may ingest the fluid. Also, the device of Reset et al. does not incorporate an air-activated squeaker and does not resemble an animal.

U.S. Des. Pat. No. 142,395 to Fisk et al shows a design for a toy ball shaped like the head of animal. Such a ball cannot roll in all directions due to the long protruding ears and so its play value is thereby limited. Also it.does not resemble an entire animal and is therefore less realistic than a ball that gives the image of a complete animal. Thirdly, it does not incorporate a squeaker.

U.S. Des. Pat. No. 424,256 to Lindgren shows a design for a round ball for pets with a face on it. Such a toy does not provide as realistic a representation as does a ball that resembles a complete animal body including limbs. Also the facial features do not protrude from the surface of the ball in any way. Therefore the ball is perfectly round in all practical respects and will roll in a smooth manner. The invention of the applicant incorporates features that protrude slightly from the surface of the ball which, in addition to giving a more realistic appearance, impart an erratic motion to it as it rolls, thereby giving a more realistic impression of a small animal scurrying about.

U.S. Des. Pat. No. 145,875 to Plebanek shows a clown contorted in a shape that is generally round like a ball, however the device does not incorporate a squeaker.

SUMMARY

The invention comprises a hollow ball of resilient or flexible material made to resemble a small creature. The ball has an air-activated noise-maker or squeaker.

OBJECTS AND ADVANTAGES

The present invention provides novel ball for use by pets that offers several advantageous features. The ball, having a hollow cavity inside, is light in weight and therefore easy to bat about. Being made of resilient, flexible material, the ball is easily deformed when bitten by the pet, thereby allowing the pet to better grip it in its mouth. Because the ball is formed in the shape of an animal, it appeals to pets that tend to chase animals. The invention incorporates at least one air-activated sound-making device, such as a squeaker. Such a sound feature adds to the play value of the ball by increasing its resemblance to an animal. The ball rolls freely in all directions yet, due to the slightly protruding features on its outer surface, such as ears, legs, and tail, it moves with a slightly erratic motion, accompanied by a pitter-patter sound when used on a smooth, hard surface such as a wooden or tile floor. The erratic motion and pitter-patter sound evoke the sense of a moving animal.

DRAWING FIGURES

REFERENCE NUMERALS IN DRAWINGS

Figure 1:
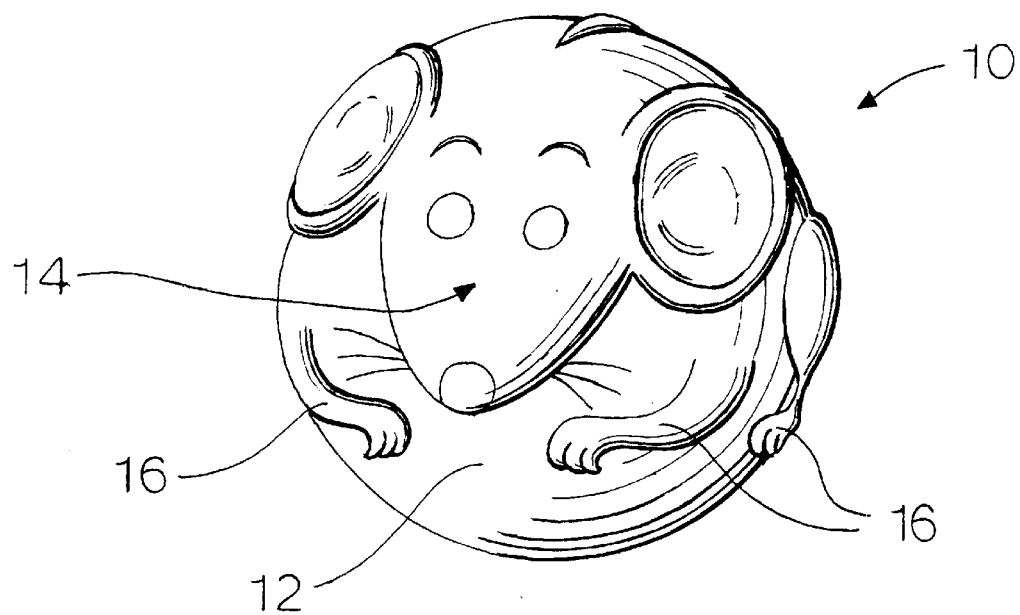
FIG. 1 shows a front perspective view of the invention.
Figure 2:
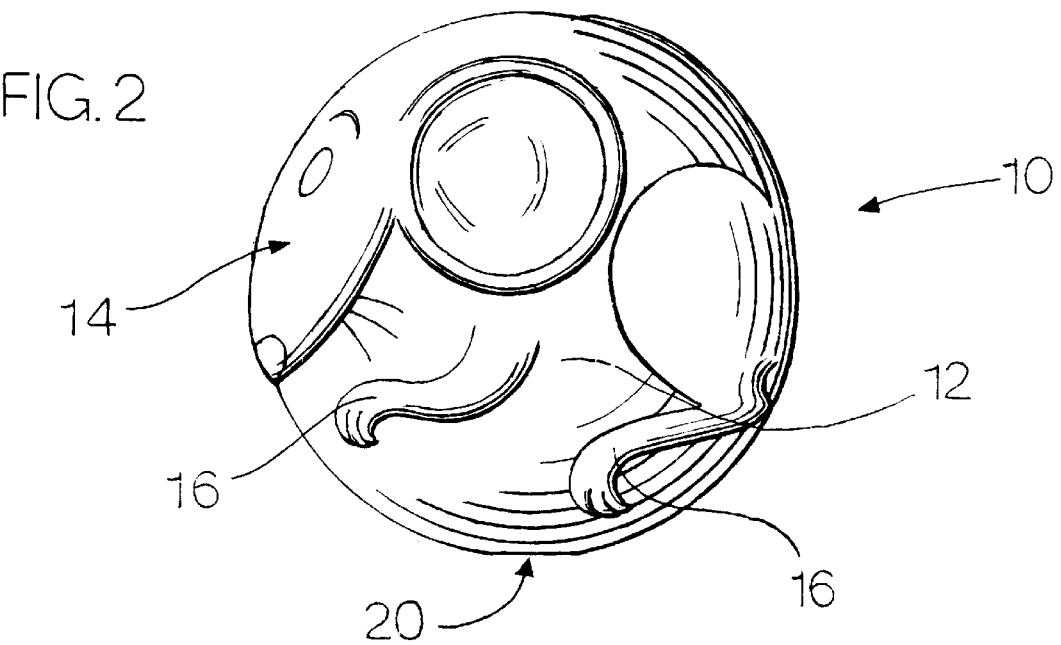
FIG. 2 shows a side elevation view of the invention.
Figure 3:
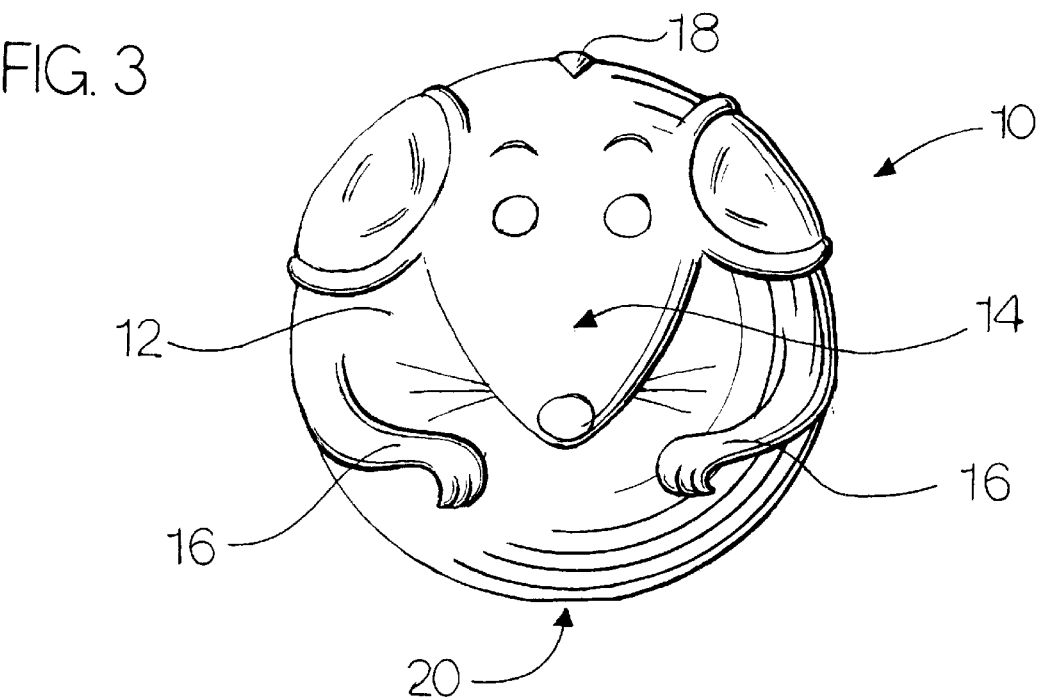
FIG. 3 shows a front elevation view of the invention.
Figure 4:
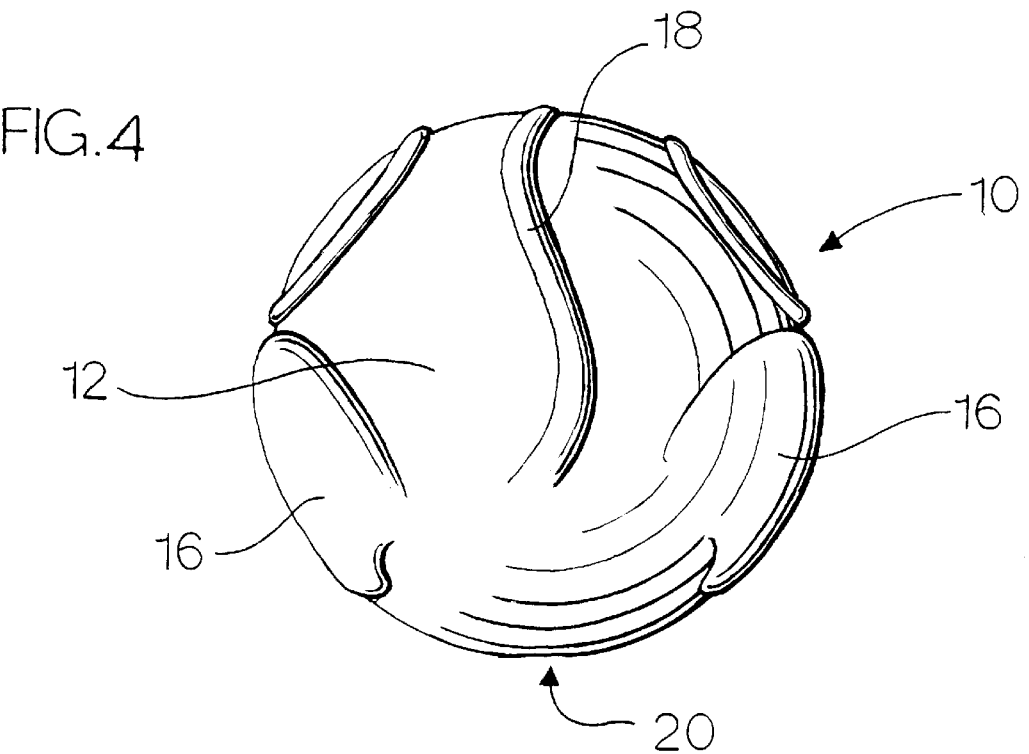
FIG. 4 shows a rear elevation view of the invention.
Figure 5:
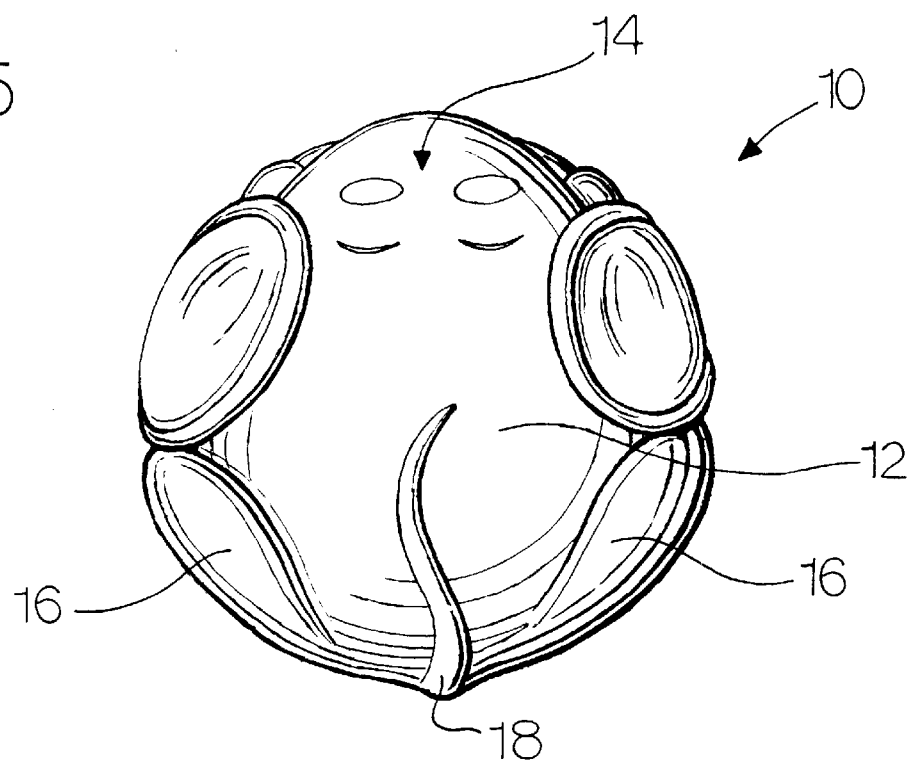
FIG. 5 shows a top view of the invention.
Figure 6:
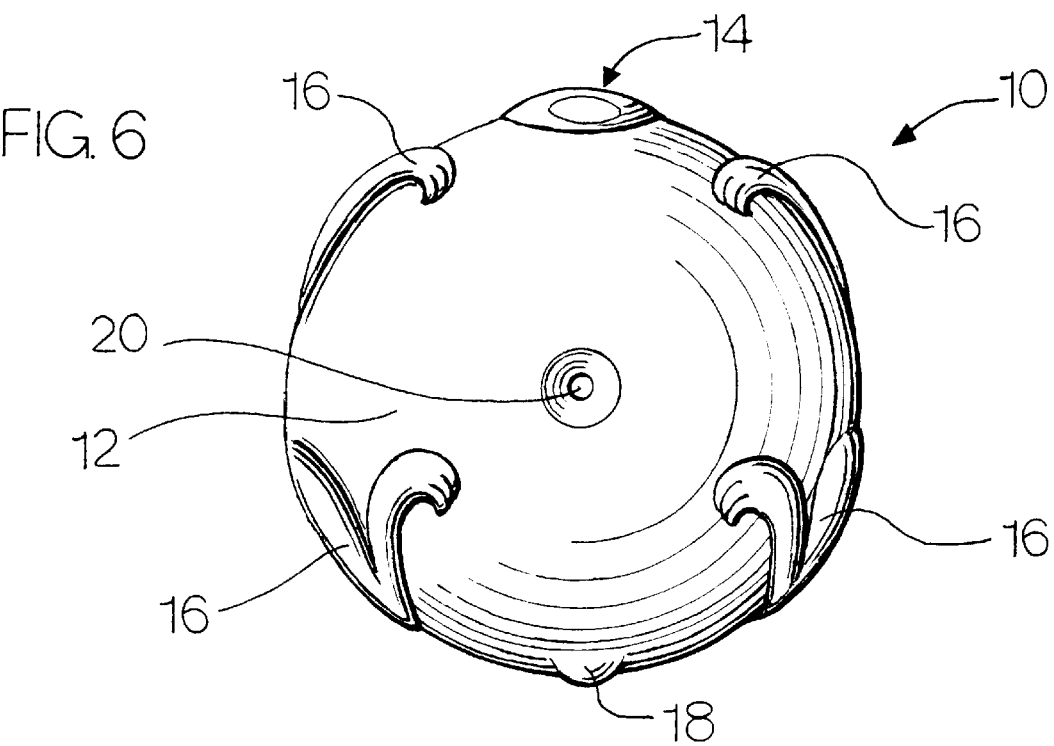
FIG. 6 shows a bottom view of the invention.
Figure 7:
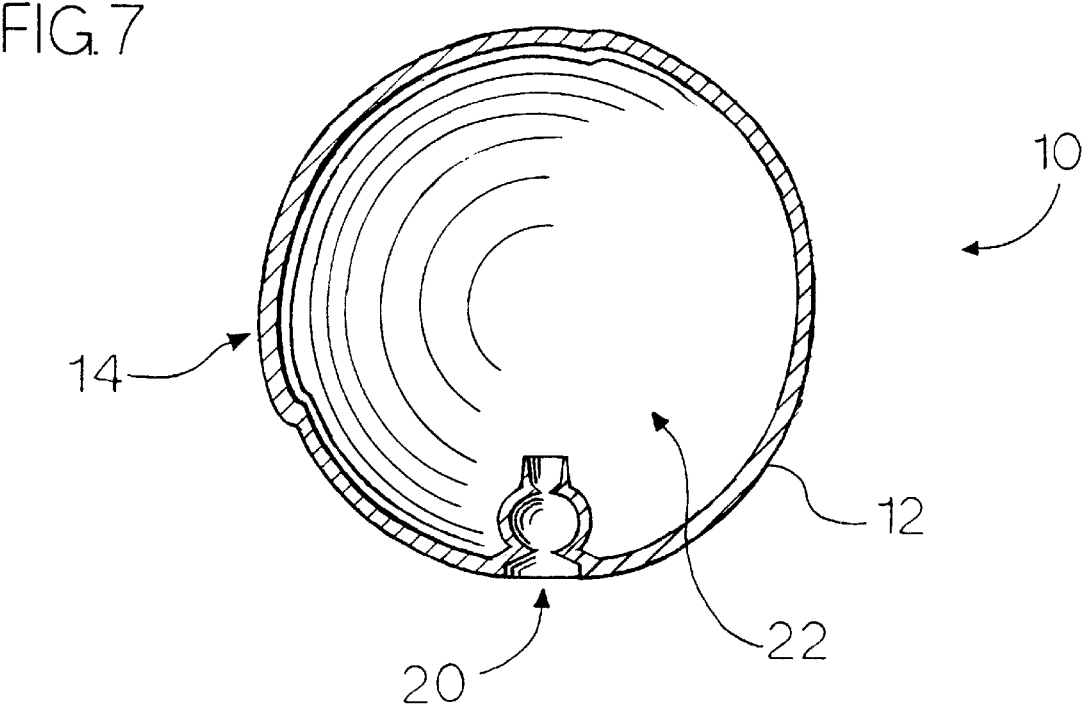
FIG. 7 shows a cross-section view of the invention.
Figure 8:
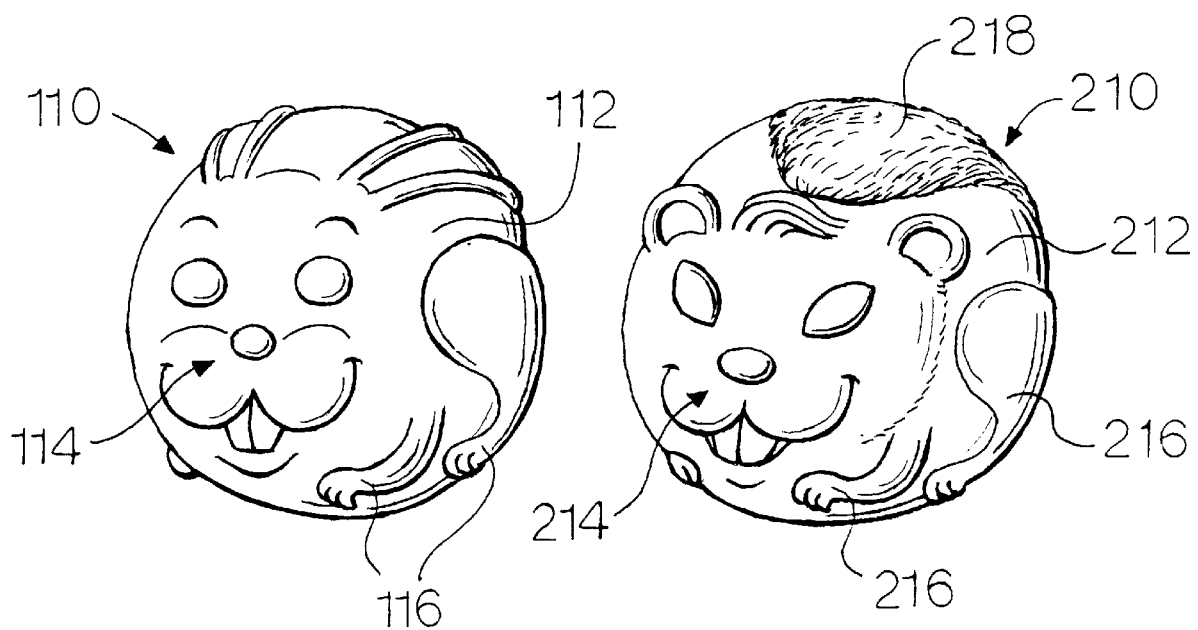
FIG. 8 shows alternative embodiments of the invention.

10 Ball
12 Outer surface of ball
14 Face of ornamental animal
16 Leg of ornamental animal
18 Tail of ornamental animal
20 Sound maker
22 Hollow cavity inside of ball
110 First alternative embodiment of the ball
112 Outer surface of first alternative embodiment of ball
114 Face of ornamental animal of first alternative embodiment of ball
116 Leg of ornamental animal of first alternative embodiment of ball
210 Second alternative embodiment of ball
212 Outer surface of second alternative embodiment of ball
214 Face of ornamental animal of second alternative of ball 216 Leg of ornamental animal of second alternative embodiment of ball 218 Tail of ornamental animal of second alternative embodiment of ball

OPERATION

The present invention comprises a ball 10 that is intended for use by pets. In the preferred embodiment, the ball 10 is made of resilient, flexible material such as vinyl or latex rubber and has a hollow space inside 22, thereby making it light in weight. The low weight of the ball 10 makes it well suited for play by small pets. The ball 10 may be batted about easily by the paws of the pet and may be chased, bitten, or carried in the mouth of the pet. Further, it may be thrown or rolled by the pet owner in order for the pet to chase it.

The ball 10 incorporates at least one air-activated sound-making device 20 such as the type of squeaker commonly found in pet toys. The pet may operate the squeaker or noise-maker 20 by squeezing the ball 10 in its the mouth, thereby forcing the air within the hollow space 22 to rush out through the noise-maker 20, causing a sound. The pet owner may also squeeze the ball 10 in his or her hand during interactive play with the pet, causing the sound.

The ball 10 is essentially round in shape, thereby allowing it to roll freely in all directions. The free rolling of the ball 10 in any direction allows for a wide variety of play possibilities.

The outer surface 12 of the ball 10 has ornamental features such as a face 14, legs 16, and tail 18 giving the ball 10 a resemblance to an animal. Because the ball 10 resembles an animal, it is believed to be appealing to those pets who have a natural tendency to chase and bite small animals.

Further, the ornamental animal features 14, 16, 18 protrude from the surface 12 of the ball making the surface of the ball 10 slightly irregular. The surface irregularities 14, 16, 18 of the ball 10 cause it to roll in a slightly erratic motion, wiggling a bit as it rolls, thereby enhancing the perception of the ball 10 being a live animal. The surface irregularities 14, 16, 18 may also cause a slight pitter-patter sound as the ball 10 rolls across a smooth hard floor.

The tiny sounds made by the rolling ball 10 may excite the pet by resembling the sound of an animal scurrying about.

CONCLUSIONS, RAMIFICATIONS, AND SCOPE

The present invention is a new and useful ball toy for pets. In its appearance, sound, and erratic motion, it bears some resemblance to an animal. It can be easily deformed so as to allow the pet to bite it and grab it easily. It is light in weight, allowing the pet to bat it about easily. And it can be easily rolled in any direction.

The specificities contained in the above descriptions should not be construed as limiting the overall scope invention. The embodiments described and shown herein are only intended as illustrations and examples. The range of possible embodiments is much broader than can be practically shown in this document. The ball can resemble other animals than those shown, the artistic style of representation of the animals may vary, the materials used may vary, and various types of common squeakers may be incorporated without changing the nature and scope of the invention. Therefore the scope of the invention should be judged by the appended claims and their legal equivalents rather than by the examples given.

I claim:

1. A toy ball that is generally round in shape so as to be capable of rolling freely in all directions a) said ball made of resilient material encompassing a hollow cavity inside b) said hollow cavity having at least one squeaker connected to it c) said squeaker being activated by air moving though it, into and out of the hollow cavity to which it is connected, as said ball is squeezed and released d) said ball having ornamental features molded in relief upon its outer surface that cause it to resemble an animal in appearance and cause it to roll in an erratic manner so as to resemble an animal in motion.

* * * * *